United States Patent
Alofs

(10) Patent No.: US 7,404,069 B2
(45) Date of Patent: Jul. 22, 2008

(54) BRANCH TRACING GENERATOR DEVICE AND METHOD FOR A MICROPROCESSOR SUPPORTING PREDICATED INSTRUCTIONS AND EXPANDED INSTRUCTIONS

(75) Inventor: Thomas Alofs, Grenoble (DE)

(73) Assignee: STMicroelectronics SA, Montrouge (FR)

(*) Notice: Subject to any disclaimer, the term of this patent is extended or adjusted under 35 U.S.C. 154(b) by 39 days.

(21) Appl. No.: 11/368,332

(22) Filed: Mar. 3, 2006

(65) Prior Publication Data

US 2006/0224868 A1    Oct. 5, 2006

(30) Foreign Application Priority Data

Mar. 4, 2005    (FR) .................................. 05 02187

(51) Int. Cl.
*G06F 9/44* (2006.01)

(52) U.S. Cl. ....................... 712/227; 717/128

(58) Field of Classification Search .............. 717/128, 717/131, 132; 712/227
See application file for complete search history.

(56) References Cited

U.S. PATENT DOCUMENTS

| | | | | |
|---|---|---|---|---|
| 6,094,729 | A * | 7/2000 | Mann | 714/25 |
| 6,609,247 | B1 | 8/2003 | Dua et al. | 717/128 |
| 6,633,973 | B1 | 10/2003 | Kanzaki | 712/227 |
| 7,155,570 | B1 * | 12/2006 | Singh et al. | 711/118 |
| 2003/0051122 | A1 | 3/2003 | Sato | 712/227 |
| 2003/0135719 | A1 * | 7/2003 | DeWitt et al. | 712/227 |

FOREIGN PATENT DOCUMENTS

EP    1 091 298 A2    4/2001

* cited by examiner

*Primary Examiner*—David J Huisman
(74) *Attorney, Agent, or Firm*—Lisa K. Jorgenson; Dennis M. de Guzman; Seed IP Law Group PLLC

(57) ABSTRACT

A device generates an address branch trace for a microcontroller unit, a microprocessor or a data processing unit having a set of instructions including at least one predicated instruction and at least one instruction of the expanded type. The device includes: a first block to receive a first signal representative of an actually executed instruction; a second block to receive a second signal representative of an expanded instruction; a third block to receive a third signal representative of a discontinuity branch between a source address and a destination address of a program executed by the microcontroller, microprocessor or data processing unit; at least one register to store consecutive addresses pointed to by a program counter; a fourth block to process the first, second and third signals in order to determine a pair having a source address and a destination address for an address branch, when appropriate; and a storage unit to store said address pair.

11 Claims, 3 Drawing Sheets

```
0x8000040c:  e3500002  ..P.  CMP   r0,#2
0x80000410:  bafffffb  ....  BLT   0x80000404
0x80000414:  e5960200  ...P. LDR   r0,[r6,#0x200]
0x80000418:  e3500001  ..P.  CMP   r0,#1
0x8000041c:  1afffffc  ....  BNE   0x80000414
0x80000420:  e59f00f0  ....  LDR   r0,0x80000528
0x80000424:  e3a014c0  ....  MOV   r1,#0xc0000000
0x80000428:  e3a0303f  ?0..  MOV   r3,#0x3f
0x8000042c:  e3a02000  ....  MOV   r2,#0
0x80000430:  ebffff32  2...  BL    0x80000100
0x80000434:  e59f00e0  ....  LDR   r0,0x8000051c
0x80000438:  e59f10e0  ....  LDR   r1,0x80000520
0x8000043c:  e3a03024  $0..  MOV   r3,#0x24
0x80000440:  e3a02000  ....  MOV   r2,#0
0x80000444:  ebffff2d  -...  BL    0x80000100
0x80000448:  e59f00d4  ....  LDR   r0,0x80000524
0x8000044c:  e59f10d4  ....  LDR   r1,0x80000528
0x80000450:  e3a030cd  .0..  MOV   r3,#0xcd
0x80000454:  e3a02000  ....  MOV   r2,#0
0x80000458:  ebffff28  (...  BL    0x80000100
0x8000045c:  e59f00c8  ....  LDR   r0,0x8000052c
0x80000460:  e59f10c8  ....  LDR   r1,0x80000530
```

Branch Trace:
src/dest0:
0x80000410
0x80000404
src/dest1:
0x8000041c
0x80000414
src/dest2:
0x80000430
0x80000100
src/dest3:
0x80000444
0x80000100
src/dest3:
...

FIG. 1

```
0x0c  // G0 up to G3 are cleared in the following
0x0c  // G4 up to G7 are set in the following
0x0c  // Most other GP16 instructions are predicated by G0
0x0c  cmpeqw G0, R4, R5
0x10  goto dest  // branch source instruction
0x14  G0? add R3, R2, R1
0x18  G5? sub R4, R2, R5
dest:
0x1c  G0? add R3, R4, 2  // branch target (NOT committed)
0x20  G1? add R4, R2, 5  // NOT committed
0x24  G2? sub R4, R2, R5 // NOT committed
0x28  G4? add R3, R2, R1 // committed: This is the target PC
0x28  // after the branch to be written to the branch trace
```

Branch
Trace:
src/dest0:
0x10
0x28
src/dest1:
...

FIG. 2

ND METHOD FOR A MICROPROCESSOR
BRANCH TRACING GENERATOR DEVICE AND METHOD FOR A MICROPROCESSOR SUPPORTING PREDICATED INSTRUCTIONS AND EXPANDED INSTRUCTIONS

TECHNICAL FIELD

The present disclosure generally relates to the field of electronic systems having a microprocessor, and in particular but not exclusively to a branch trace device for a microprocessor.

BACKGROUND INFORMATION

The use of microprocessors is spreading to all electronic systems. Aside from basic microcontrollers (such as 80C51 from Intel Corp.®), there can be found particularly sophisticated and powerful microprocessors, and in particular digital signal processors (D.S.P.)

The most advanced processing units are based on a set of complex instructions comprising in particular predicated instructions and expanded instructions.

Thus, predicated instructions can be found in processors of the TIC62x DSP type by Texas Instrument®, in Itanium processors of Intel®, or in the StarCore SCx DSP family by Motorola etc. Instructions of the expanded type are found in processors such as Itanium from Intel®, ADSP Blackfin from Analog Devices® and in DSP kernels of the ST100 family from STMicroelectronics S.A®.

The presence of predicated instructions (PREDICATED) or expanded instructions (EXPANDED) makes burn-in operation difficult and more generally impedes evaluation of the functionalities of a program written as an assembler. Indeed, on one hand, predicated instructions might not be executed, and on the other hand, instructions of the expanded type cause cascaded execution of sub-instructions that makes reading and interpretation of typical/standard branch trace files difficult.

Generally, the typical branch tracing file generated during program flow does not allow computer programmers to easily follow program flow such as it is really executed, which does not really make programming error detection and correction easier.

It is desired to have a simple and effective branch tracing mechanism that is perfectly adapted to the advanced instructions of the PREDICATED and EXPANDED types.

BRIEF SUMMARY OF THE INVENTION

An embodiment of the present invention provides a new branch tracing mechanism adapted to use predicated or expanded instructions that can be found in last generation processors including sets of predicated and expanded instructions.

One embodiment of the present invention provides an efficient branch tracing mechanism for realizing branch trace in microprocessors supporting predicated instructions and expanded instructions.

An embodiment of this invention provides an effective programming error correction tool, adapted to the structure of sophisticated microprocessors integrating predicated instructions and expanded instructions.

One embodiment of the invention provides a branch address tracing device that comprises:

means for receiving a first signal (VALID) characteristic of an executed instruction;

means for receiving a second signal (EXP) characteristic of an instruction of the expanded type;

means for receiving a third signal (DISC) characteristic of a discontinuity branch between a source address and a destination address in a running program;

means for storing consecutive addresses pointed by the program counter;

means for processing signals VALID, EXP and DISC in order to determine a pair comprised of a source address and a destination address for an address branch, if necessary;

FIFO-type means for storing the automatically generated address pair.

In one embodiment, the device comprises:

a first register receiving the current value of the program counter presented by said microcontroller, microprocessor or processing unit;

a second register having an input and an output;

a first multiplexer having an output, a first input connected to the output of said first register and a second input connected to its own output, and being controlled by said VALID signal in order to allow either storing of the contents of said first register, or recycling of the value previously stored in said second register.

The device of an embodiment more particularly comprises:

a third register having an input and an output;

a second multiplexer having an output and a first input connected to the output of said second register and a second input connected to its own output, said second multiplexer being controlled by a first control signal (FSM1) generated by a state machine.

A third multiplexer comprises a first input connected to the output of the third register and a second input connected to the output of the second register, and an output connected to said storage means (FIFO). The third multiplexer is controlled by a second control signal (FSM2) generated by said state machine.

In an example embodiment, the state machine receiving the first, second and third signals (VALID, EXP, DISC) is a 3-state state machine, which allows generation of control signals (FSM1, FSM2) for the second and third multiplexers, as well as generation of a write signal to FIFO memory.

BRIEF DESCRIPTION OF THE SEVERAL VIEWS OF THE DRAWINGS

Other features of embodiments of the invention will appear when reading the following description and drawings, only given by way of nonrestrictive examples. In the accompanying drawings:

FIG. 1 illustrates a first example of generation of a branch trace file for an assembler program.

FIG. 2 illustrates a second example of generation of a branch trace file in the case of predicated instructions.

DETAILED DESCRIPTION

Figure 3:
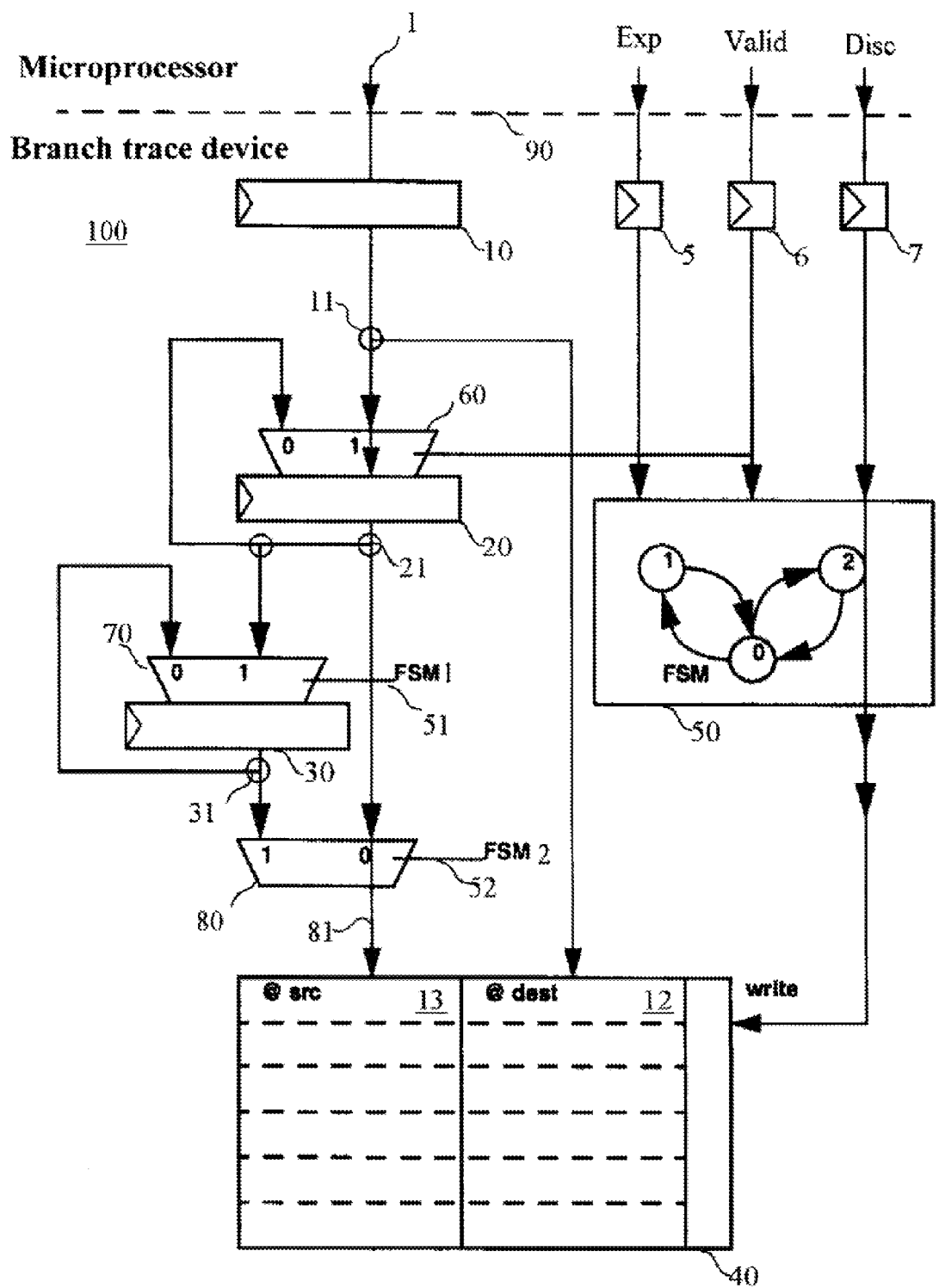
FIG. 3 illustrates a mechanism of branch trace generation in accordance with one embodiment of the present invention.

Embodiments of branch tracing generator device for a microprocessor and microprocessor equipped with such a device are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity's sake, it is pointed out that, generally, program execution tracing is carried out by generating a branch trace file that comprises tracing program counter branches when discontinuity of the program counter appears due to a branch instruction such as JUMP, CALL, GOTO etc.

In practice, as can be seen in FIG. 1, each pair of the BRANCH TRACE file comprises a first address indicating the starting address (for example 0x80000410 in FIG. 1), and the destination address (0x80000404) of the instruction branch.

When the instruction to be executed is of predicated type, it is observed that the first executed instruction that follows a branch (resulting from JUMP, GOTO or CALL for example) is not always the instruction placed directly after the jump or branch. Indeed, since this instruction can be a predicated instruction, it might not be executed in certain cases and, consequently, it is necessary that the branch trace file clearly indicates which is the first instruction executed after a discontinuity. FIG. 2 shows an example of an assembler program comprising an instruction GOTO causing branching to address 0x1c, at address 0x10. From destination address 0x1c, follows a sequence of four predicated instructions respectively associated to four guards G0, G1, G2 and G4. If the contents of guards G0, G1, G2, G4 are such that the first three instructions (corresponding to addresses 0x1c, 0x20 and 0x24) are not executed, it is then noted that the first instruction executed immediately after the address branch or jump is the instruction of address 0x28.

To allow programmers to easily detect and correct programming errors, it is desirable that branch tracing shows actual program execution and clearly indicates program counter address branches, as shown in FIG. 2 where the record of pair (0x10, 0x28) clearly shows a branch from 0x10 to 0x28. Thus, the programmer will be able to identify the first instruction executed after such branch, namely the instruction corresponding to address 0x28, without ambiguity.

Regarding instructions of the EXPANDED type, it can be noted that they generate the execution of a sequence of sub-instructions. The typical case is instruction PUSHx (resp. POPx) that causes the execution of multiple sub-instructions of the LOAD type (resp. STORE). In such a situation to facilitate programmer corrections, it is also desirable that branch trace also takes into account the potential existence of expanded instructions (such as PUSH or POP for example), namely instructions the execution of which causes running of cascaded sub-instructions (such as STORE or LOAD for example).

FIG. 3 illustrates the schematic diagram of a mechanism in accordance with one embodiment of the present invention that makes it possible to advantageously generate an instruction branch trace file showing the actual execution of predicated instructions and expanded instructions.

As can be seen on FIG. 3, the embodiment of the invention comprises a branch trace device 100 that is connected via an interface 90 to a processor of unspecified type, but integrating a set of predicated instructions and a set of expanded instructions, such as PUSH or POP. People qualified in the art will be able to readily adapt the teaching of the embodiment(s) of the invention to any particular processor, such as a microcontroller, a microprocessor, a digital signal processor (D.S.P.) etc.

Interface 90 to the processor allows transfer of address 1 of the program counter that, as it is known, shows the current address of an executed instruction. Moreover, the interface comprises three control signals EXP, VALID and DISC, which are defined below:

EXP (Expanded) is a signal that is in state 1 when the instruction corresponding to the current address is an expanded instruction.

VALID (predicated) is a signal that is in state 1 when a predicated instruction is actually executed.

DISC (Discontinuity) is a signal that switches to an active state whenever the processor detects an address branch or discontinuity in a program flow. More precisely, DISC goes to an active state when the destination PC of a discontinuity is present on input 1 (cf. FIG. 3).

The three control signals EXP, VALID and DISC are respectively stored in registers 5, 6 and 7 and are transmitted to a state machine 50. For convenience purposes, hereinafter signals DISC, EXP and VALID are considered as being signals output from registers 5, 6 and 7, which (regarding clock cycles) shall not be mixed up with the input signals of such registers.

The branch trace device then comprises three registers, respectively 10, 20 and 30 having an output 11, 21 and 31, respectively.

The device 100 also comprises a first multiplexer 60 having a first input connected to output 11 of register 10 and a second input connected to output 21 of register 20. The multiplexer 60 has an output connected to the input of register 20 and is controlled by signal VALID, stored in register 6. As a result, when signal VALID is equal to 1, the value stored in register 10 is then transmitted to the output of multiplexer 60, on the following cycle. On the other hand, when VALID is equal to 0, then, on the following cycle, the output of the register 20 is then recycled and fed back to the input of register 20 via multiplexer 60.

The device 100 also comprises a second multiplexer 70 having a first input connected to output 21 of register 20 and a second input connected to output 31 of register 30. The multiplexer 70 has an output connected to the input of register 30 and is controlled at its control terminal 51 by a signal FSM1 generated by state machine 50. When FSM1 is equal to 1, then the output of register 20 is directly transmitted to the input of register 30 and, conversely, when FSM1 is equal to 0, then the output of register 30 is recycled to the input and, consequently, the contents of register 30 are then recycled via multiplexer 70.

The device 100 finally comprises a third multiplexer 80 having a first input connected to output 21 of register 20 and a second input connected to output 31 of register 30. Multiplexer 80 has an output 81 and is controlled at its control terminal 52 by a control signal FSM2 generated by state machine 50 so that when FSM2=1 then, output 31 of the register 30 is transmitted to output 81 of the multiplexer 80. Conversely, when FSM2=0, the signal from output 21 is transmitted to output 81 of multiplexer 80.

Output 81 of multiplexer 80 is connected to input @SRC (address) at memory location 13 of a FIFO memory 40, which has an input @DEST (destination address) at memory location 12 that is connected to output 11 of register 10. The FIFO memory 40 is any kind of memory operating according to a "first-in, first-out" principle and such memory has a WRITE control that is also generated by state machine 50.

State machine 50 receives the three input signals EXP, VALID and DISC stored in registers 5, 6 and 7 respectively and comprises three distinct states making it possible to generate signals FSM1, FSM2 and WRITE signal to FIFO memory.

The operation of the device 100 according to embodiment(s) of the invention will now be more particularly described now.

Generally, registers are controlled by a clock signal that is the clock signal of the microprocessor. With each clock cycle, the microcontroller or microprocessor sends the current address of the program counter and an active DISC signal (=1) whenever the program flow encounters a discontinuity (e.g., a destination PC according to the previous discussion about signal DISC).

State machine 50 goes from a state 0 to a state 1 when both conditions VALID=0 and DISC=1 are simultaneously present. The state machine 50 returns from state 1 to state 0 when signal VALID switches from state 0 to state 1.

In addition, state machine 50 goes from a state 0 to a state 2 when the following conditions are met: DISC=0 and EXP=1 and VALID=1. Return from state 2 to state 0 occurs when the following conditions are met: VALID=1, DISC=1 and EXP=1

Finally, the state machine 50 generates signals FSM1 and FSM2 in accordance with the following formulas:

FSM1 is active when the following conditions are met: DISC=0, VALID=1, EXP=1

FSM2 is active when the following conditions are met: DISC=1, VALID=0, EXP=1 and the state machine is in state 2 (FSM=2).

As for the write signal:

WRITE is activated when one the following condition occurs: (FSM=0, VALID=1, DISCONT=1) OR (FSM=1, VALID=1) OR (FSM=2, DISC=1)

As will be noted, the described device makes it possible to store couples (source address @SRC, destination address @DEST) for both predicated instructions and expanded instructions.

A. Predicated Instructions

Let us consider for example the program illustrated in FIG. 2, and in particular its program flow before branching of address 0x10. It is supposed that state machine 50 is in state 0.

At the cycle before the branch, (cycle 1), the bus 1 carries address 0x0c and a signal Valid=1, which is then loaded in the register 10, 6.

At the time of the following cycle (cycle 2), value 0x10 is presented to the bus of program counter 1. Control signal VALID being active (which corresponds to the assumption of an actually executed instruction), multiplexer 60 transmits the signal present on its first input (output signal 11) to the input of register 20. The value previously stored in register 10—namely 0x0c—then goes to register 20 while the current address value 0x10 is stored in register 10.

The following instruction 0x10 corresponds to a branch instruction. The signal of discontinuity DISC is then activated.

At the following cycle (cycle 3), the program counter shows value 0x1c that is stored in register 10 while the previously stored value—namely 0x10—goes to register 20.

As the corresponding instruction is not executed (since, by assumption, it is considered that condition G0 is in a low state) then signal VALID is in state 0, which will cause recycling of the contents of register 20—namely 0x10—by multiplexer 60, at the following cycle.

The simultaneous presence of conditions VALID=0 and DISC=1 implies state machine 50 going from state 0 to state 1. The state machine 50 remains in state 0 as long as VALID stays to 0.

So, none of the following addresses 0x20 (cycle 4) and 0x24 (cycle 5) allow a return to state 0 since, by assumption, guards G1 and G2 are equal to 0, causing signal VALID to stay at state 0. During these two cycles corresponding to two not executed addresses 0x20 and 0x24, it can be noted that register 20 keeps the initial stored value, namely 0x10, which is the value of the source address (@SRC) counter.

The presentation of address 0x28 (cycle 6), corresponding to an actually executed instruction (since G4 is by assumption equal to 1), will cause the return of condition VALID=1 and, consequently, the return to state 0 of the state machine 50, thus causing a write command WRITE to FIFO memory.

Signal FSM2 being at 0, it is noted that a pair of two addresses is written to the FIFO: a first address that is the contents of register 20, namely 0x10, which is the branch source address (@SRC), and a second address, namely address 0x28, which is the destination address (@DEST).

This address pair (0x10, 0x28) indeed identifies an address branch from a source address to a destination address that corresponds to an actually executed address.

We will now show that the device is quite as effective in the case of an expanded instruction.

B. EXPANDED Instructions

Let us now consider the case of a program including instructions of the expanded type, such as PUSHx or POPx. In such a context, it will now be assumed that signal VALID stays at 1.

More particularly, let us consider the example of a branch instruction (CALL) at an address 0x10, calling an instruction PUSH present at an address 0x20. The assembler program could be as follows:

```
0x10 Call Sub
...
...
0x20: Push
0x24: Add
0x28: Sub
....
0x34 Return
```

Instruction PUSH causes flowing of a series of sub-instructions, which will all be assumed to be at the same address 0x28:

```
STORE R0
STORE R1
STORE R2
...
STORE R15
```

Operation flow will now be described.

During a first cycle, the processor executes the instruction present at address 0x10 while this specific address is stored in register 10. Instruction CALL sub is then decoded and branching to address 0x20 occurs.

In a second cycle, address 0x20 is presented on bus 1 and is stored in register 10 while the address value previously stored in this register (namely 0x10) is stored in register 20 via multiplexer 60. At the same time, the processor having detected the presence of an expanded instruction activates control signal EXP. But it should be noted that signal DISC stays in a low state until the last sub-instruction because, before that sub-instruction, the processor cannot confirm an expanded instruction.

It is thus noted that, as soon as signal EXP goes to 1, the state machine 50 switches from state 0 to state 2, which activates control signal FSM1. Consequently, the value previously stored in register 20 (0x10) will then be stored in register 30, at the next clock cycle, where it will be kept and recycled until state machine 50 goes back to state 0.

Thus, it is possible to keep value 0x10 that is a potential source address, which can however only be confirmed with the last sub-instruction (STORE R15) by means of the activation of signal DISC.

Thus, successive running of each sub-instruction making up expanded instruction PUSH . . . is obtained. The address that is common to all these sub-instructions, namely 0x20, stays on bus 1 and consequently remains stored in register 10, whereas register 30 keeps value 0x10 that was the source address of the address branch.

When the last sub-instruction (STORE R15) is processed, control signal DISC goes to state 1 under processor control. The simultaneous occurrence of states VALID=1, EXP=1 and DISC=1 then causes state machine 50 to switch back to state 0 and activates control signal FSM2, controlling multiplexer 80.

State machine 50 generates a WRITE signal, thus causing the storage of pair (0x10, 0x20) in FIFO memory 40, which indeed corresponds to the source and destination addresses of the branch that is realized.

Thus, with a mechanism that is as simple as effective, it is possible to trace an instruction of the expanded type while, at the same time the execution of this instruction will only be confirmed with the execution of the last sub-instruction making up the expanded instruction. Namely when, during execution of the last sub-instruction, signal DISC=1 is received. It is thus possible to effectively follow a realized address branch and to update an address branch trace file.

As can be seen, the invention thus allows the realization of a new mechanism making it possible to generate a BRANCH TRACE file when the processor integrates high-level PREDICATED and EXPANDED instructions. Meticulous examination of the BRANCH TRACE file allows programmers to follow program flow and thus to detect and correct programming errors.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A device for generating an address branch trace for a microcontroller unit, a microprocessor or a data processing unit having a set of instructions including at least one predicated instruction and at least one instruction of an expanded type, said device comprising:
    means for receiving a first signal representative of an actually executed instruction;
    means for receiving a second signal representative of an expanded instruction;
    means for receiving a third signal representative of a discontinuity branch between a source address and a destination address of a program executed by said microcontroller, microprocessor or data processing unit;
    means for storing consecutive addresses pointed to by a program counter;
    means including a state machine for processing said first, second and third signals in order to determine a pair that includes a source address and a destination address for an address branch, when appropriate; and
    storage means for storing said address pair,
    wherein said means for storing consecutive addresses pointed to by said program counter includes:
        a first register receiving a current value of the program counter presented by said microcontroller, microprocessor or processing unit;
        a second register having an input terminal and an output terminal;
        a first multiplexer having an output terminal, a first input terminal coupled to an output terminal of said first register and a second input terminal coupled to the output terminal of the first multiplexer, said first multiplexer being controlled by said first signal in order to allow either storing of contents of said first register, or recycling of a value previously stored in said second register;
        a third register having an input terminal and an output terminal;
        a second multiplexer having an output terminal, a first input terminal coupled to the output terminal of said second register, and a second input terminal coupled to the output terminal of the second multiplexer, said second multiplexer being controlled by a first control signal generated by said state machine; and
        a third multiplexer having a first input terminal coupled to the output terminal of said third register and a second input terminal coupled to the output terminal of said second register, and an output terminal coupled to said storage means for storing said address pair, said third multiplexer being controlled by a second control signal generated by said state machine.

2. A device according to claim 1 wherein said state machine receiving said first, second and third signals is a 3-state state machine generating said first and second control signals controlling said second and third multiplexers, and generating a write signal to said storage means for storing said address pair.

3. A device according to claim 1 wherein said storage means for storing said address pair is a FIFO memory.

4. A device according to claim 2 wherein said state machine generates said first and second control signals and the write signal according to the following conditions:
    FSM1 being activated when DISC=0, VALID=1, EXP=1;

FSM2 being activated when FSM=2, DISC=1, VALID=0, EXP=1; and

WRITE being activated when the following condition occurs: (FSM=0, VALID =1, DISC=1) OR (FSM=1, VALID=1) OR (FSM=2, DISC=1), wherein FSM1 is the first control signal, FSM2 is the second control signal, WRITE is the write signal, VALID is the first signal, EXP is the second signal, DISC is the third signal, FSM=0 is a state 0 of the state machine, FSM=1 is a state 1 of the state machine, and FSM=2 is a state 2 of the state machine.

5. An apparatus to generate an address branch trace for a processor having a set of instructions including at least one predicated instruction and at least one instruction of an expanded type, the apparatus comprising:

a first block to receive a first signal representative of an executed instruction;

a second block to receive a second signal representative of an expanded instruction;

a third block to receive a third signal representative of a discontinuity branch between a source address and a destination address of a program executed by the processor;

a fourth block coupled to the first, second, and third blocks to respectively process the first, second and third signals to determine an address pair for an address branch;

a storage unit coupled to the fourth block and to at least one of the first, second, or third blocks to store the determined address pair;

a first register having an input terminal to receive a value of a counter of the processor and having an output terminal;

a second register having an input terminal and an output terminal; and a first multiplexer having an output terminal coupled to the input terminal of the second register, a first input terminal coupled to the output terminal of the first register, a second input terminal coupled to the output terminal of the second register, and a control terminal coupled to the first block to receive the first signal to allow storage of an output of the first register in the second register or to allow recycling of an output of the second register back to the input terminal of the second register via the first multiplexer;

a third register having an input terminal and an output terminal; and a second multiplexer having an output terminal coupled to the input terminal of the third register, a first input terminal coupled to the output terminal of the second register, a second input terminal coupled to the output terminal of the third register, and a control terminal coupled to the fourth block to receive a first control signal, the first control signal being usable to allow receiving the output of the second register by the third register or to allow recycling of an output of the third register back to the input terminal of the third register via the second multiplexer;

a third multiplexer having an output terminal coupled to the storage unit, a first input terminal coupled to the output terminal of the third register, a second input terminal coupled to the output terminal of the second register, and a control terminal coupled to the fourth block to receive a second control signal, the second being usable to allow sending an output of the third register to the storage unit or the output of the second register to the storage unit.

6. The apparatus of claim 5 wherein the fourth block comprises a state machine.

7. The apparatus of claim 5 wherein the determined address pair comprises a source address and a destination address.

8. The apparatus of claim 5 wherein the storage unit comprises a FIFO memory.

9. A microcontroller, comprising:

a device for generating an address branch trace for a microcontroller unit, a microprocessor, or a data processing unit having a set of instructions including at least one predicated instruction and at least one instruction of an expanded type, said device including:

means for receiving a first signal representative of an actually executed instruction;

means for receiving a second signal representative of an expanded instruction, said expanded instruction, if executed, generates execution of a sequence of sub-instructions;

means for receiving a third signal representative of a discontinuity branch between a source address and a destination address of a program executed by said microcontroller, microprocessor or data processing unit;

means for storing consecutive addresses pointed to by a program counter;

means for processing said first, second and third signals in order to determine an address pair that includes a source address and a destination address for an address branch, when appropriate; and means for storing said address pair, wherein said means for storing consecutive addresses pointed to by said program counter includes:

a first register receiving a current value of the program counter;

a second register having an input terminal and an output terminal;

a first multiplexer coupled to said first and second registers and controlled by said first signal in order to allow either storing of contents of said first register, or recycling of a value previously stored in said second register;

a third register having an input terminal and an output terminal;

a second multiplexer controlled by a first control signal generated by said means for processing; and a third multiplexer having a first input terminal coupled to the output terminal of said third register and a second input terminal coupled to the output terminal of said second register, and an output terminal coupled to said means for storing said address pair, said third multiplexer being controlled by a second control signal generated by said means for processing, and wherein:

said first multiplexer has an output terminal, a first input terminal coupled to an output terminal of said first register and a second input terminal coupled to the output terminal of the first multiplexer; and said second multiplexer has an output terminal, a first input terminal coupled to the output terminal of said second register, and a second input terminal coupled to the output terminal of the second multiplexer.

10. The microcontroller of claim 9 wherein said means for processing includes a state machine.

11. The microcontroller of claim 9 wherein said means for storing said address pair includes a FIFO memory.

* * * * *